United States Patent
Baba

(10) Patent No.: US 11,348,462 B2
(45) Date of Patent: May 31, 2022

(54) COLLISION PREDICTION APPARATUS

(71) Applicant: DENSO CORPORATION, Kariya (JP)

(72) Inventor: Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 966 days.

(21) Appl. No.: 16/076,199

(22) PCT Filed: Jan. 20, 2017

(86) PCT No.: PCT/JP2017/001985
§ 371 (c)(1),
(2) Date: Aug. 7, 2018

(87) PCT Pub. No.: WO2017/138329
PCT Pub. Date: Aug. 17, 2017

(65) Prior Publication Data
US 2021/0225169 A1    Jul. 22, 2021

(30) Foreign Application Priority Data
Feb. 9, 2016  (JP) .............................. JP2016-022654

(51) Int. Cl.
*G01S 13/90* (2006.01)
*G08G 1/16* (2006.01)
(Continued)

(52) U.S. Cl.
CPC .............. *G08G 1/16* (2013.01); *G01S 13/867* (2013.01); *G01S 13/931* (2013.01); *G05D 1/0246* (2013.01); *G05D 1/0257* (2013.01); *G06K 9/629* (2013.01); *G06K 9/6215* (2013.01); *G06V 20/58* (2022.01); *B60W 30/09* (2013.01);
(Continued)

(58) Field of Classification Search
CPC .... G01S 13/003; G01S 13/9021; G01S 7/023; G01S 7/4021
See application file for complete search history.

(56) References Cited

U.S. PATENT DOCUMENTS

| 2014/0343750 A1 | 11/2014 | Minemura et al. |
| 2015/0219761 A1* | 8/2015 | Inomata ................ G08G 1/166 701/301 |
| 2018/0366001 A1* | 12/2018 | Matsunaga ....... B60W 60/0027 |

FOREIGN PATENT DOCUMENTS

JP        2014-222462 A      11/2014

* cited by examiner

*Primary Examiner* — Timothy A Brainard
(74) *Attorney, Agent, or Firm* — Maschoff Brennan

(57) ABSTRACT

A collision prediction apparatus includes a radar-detection target position detection section, a pattern matching execution section that detects an image detection target, an image-detection target position detection section, an identical target determination section that determines that the radar detection target and the image detection target are an identical target when a positional relationship between the both targets becomes a predetermined relationship; a collision prediction section that predicts whether the own vehicle is likely to collide with an identical target as an object, and a support execution section that performs driving support when a collision between the own vehicle is predicted. In the apparatus, the collision prediction section predicts whether the radar detection target, as the object, is likely to collide with the own vehicle, under conditions that the object is turning in a direction approaching the own vehicle, and that the image detection target can no longer be detected.

7 Claims, 2 Drawing Sheets

(51) Int. Cl.
  G01S 13/86   (2006.01)
  G01S 13/931  (2020.01)
  G05D 1/02    (2020.01)
  G06K 9/62    (2022.01)
  G06V 20/58   (2022.01)
  B60W 30/09   (2012.01)
  B60W 30/095  (2012.01)

(52) U.S. Cl.
  CPC ..... *B60W 30/0956* (2013.01); *B60W 2420/42* (2013.01); *B60W 2420/52* (2013.01); *G01S 2013/93185* (2020.01)

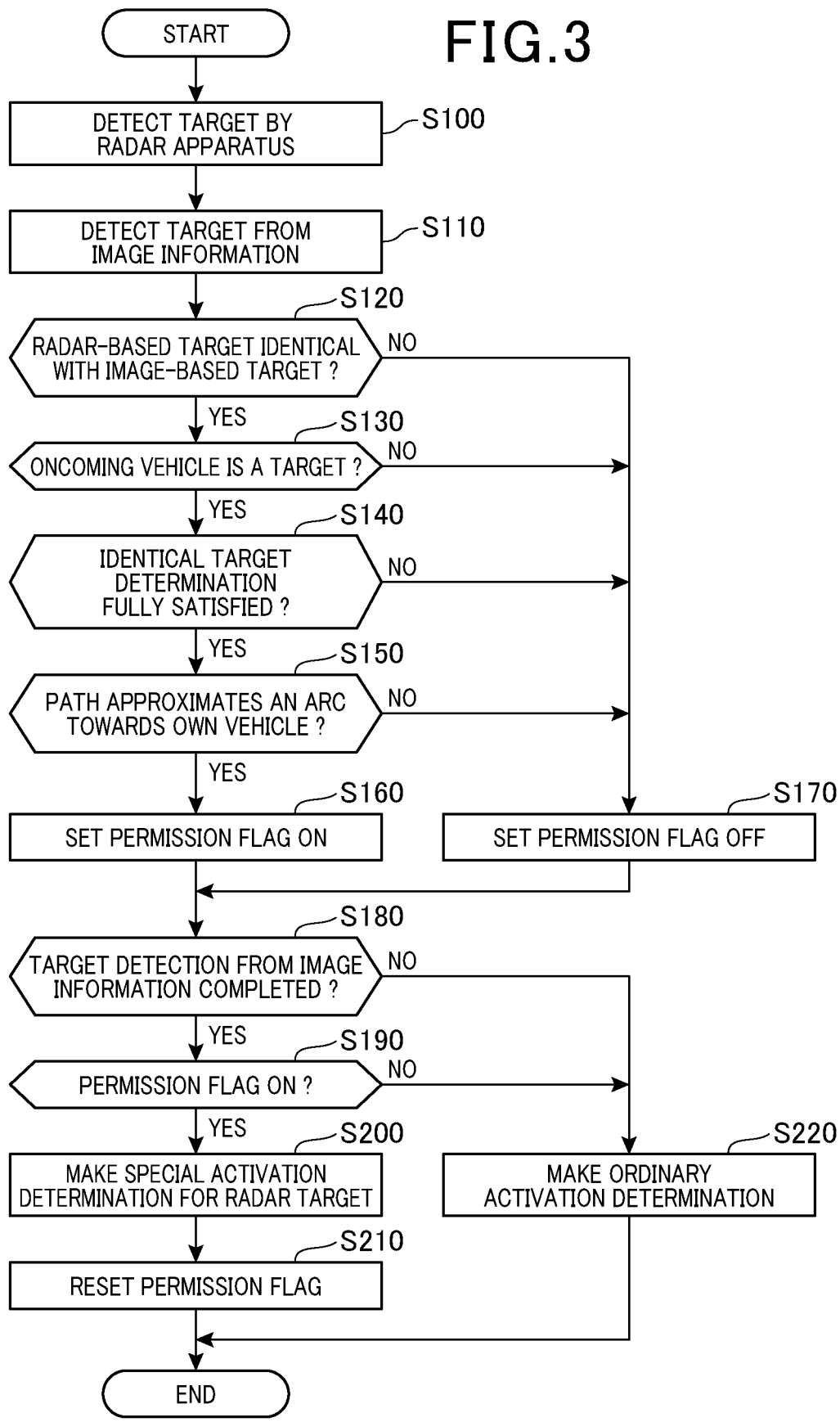

COLLISION PREDICTION APPARATUS

CROSS-REFERENCE TO RELATED APPLICATIONS

This application is a national stage application under 35 U.S.C. § 371(c) of PCT Application No. PCT/JP2017/001985, filed on Jan. 20, 2017, which is based on and claims the benefit of priority from earlier Japanese Patent Application No. 2016-022654, filed on Feb. 9, 2016, the description of which is incorporated herein by reference.

TECHNICAL FIELD

The present disclosure relates to a collision prediction apparatus mounted to a vehicle for predicting a collision between an object present ahead of the vehicle and the vehicle.

BACKGROUND ART

In recent years, along with the advancement of sensors and data processing, vehicles are increasingly equipped with driving support apparatus to avoid collision accidents that are caused by objects entering from the lateral direction into the travelling course of the vehicles. Pre-crash safety systems (PCS systems) which issue an alarm to the driver or perform an automatic braking have been known as such a driving support apparatus.

In the PCS systems, a sensor, such as a camera, or radar, is often used for detecting an object. These sensors for detecting an object may decrease their reliability depending on the weather conditions or brightness around the own vehicle. In the technology described in Patent Literature 1 (PTL 1), the reliability is determined depending on the situation, that is, whether the target (object) has been detected by both the camera and the radar, or by only one of the sensors. Then, when the reliability is determined as being low, the timing of performing a driving support for mitigating a collision is delayed. With this configuration, when the reliability is low and erroneous detection of the target is likely to occur, unnecessary activation of driving support is prevented.

CITATION LIST

Patent Literature

[PTL 1]: JP 2014-222462 A

SUMMARY OF THE INVENTION

For example, when an object is detected using a single-lens camera, the object is often recognized by pattern matching. In this regard, when the front of the object can be captured in the image, the object can be recognized accuracy. However, when the lateral side of the object is captured in the image, the pattern will differ from the pre-stored image. This inconsistency may lead to a difficulty in the object recognition using pattern matching. This problem occurs, for example, when the object traveling in an oncoming direction in terms of the traveling direction of the own vehicle changes its direction to the left or to the right. When predicting a collision between the own vehicle and an object, object detection by pattern matching becomes problematically difficult in particular due to the object changing its traveling direction to a direction approaching the own vehicle. In such a situation, delaying the activation of the driving support is not desirable since the object and the own vehicle are likely to collide. Conversely, when the driving support is activated in a state where object detection is less reliable, unnecessary activation of driving support increases.

The present disclosure has been made to solve the aforementioned issues, and has a main object to provide a collision prediction apparatus that can balance prevention of delay in activating the driving support with prevention of activating unnecessary driving support, in a situation where collision between a target (object) and the own vehicle is predicted.

The present disclosure relates to a collision prediction apparatus (10) that obtains reflection information from a radar apparatus and obtains image information from an imaging apparatus, the radar apparatus transmitting probe waves ahead of an own vehicle in a traveling direction and receiving reflected waves reflected from a target, the reflection information being based on the reflected waves, the imaging apparatus capturing an image of a region ahead of the own vehicle in a traveling direction, includes: a radar-detection target position detection section that detects a position of a radar detection target that is a target detected from the reflection information obtained from the radar apparatus; a pattern matching execution section that detects a target by checking feature points extracted from the image information obtained from the imaging apparatus against pre-stored patterns; an image-detection target position detection section that detects a position of an image detection target that is a target detected by the pattern matching execution section; an identical target determination section that determines that the radar detection target and the image detection target are identical when a positional relationship between the radar detection target and the image detection target is a predetermined relationship; a collision prediction section that predicts whether the own vehicle is likely to collide with an identical target as an object, when the radar detection target and the image detection target are determined to be the identical target by the identical target determination section; and a support execution section that performs driving support to prevent collision between the own vehicle and the target when a collision is likely between the object and the own vehicle is predicted by the collision prediction section. In the apparatus, the collision prediction section predicts whether the radar detection target, as the object, detected by the radar detection target position detection section, is likely to collide with the own vehicle, under conditions that the object is turning in a direction approaching the own vehicle, and that the image detection target can no longer be detected by the pattern matching execution section.

Let us assume a case where a target is determined as being identical by the identical target determination section up until some time, but from this time forward, an image detection target can no longer be detected and thus the target cannot be determined as being identical by the identical target determination section. In this case, when an object targeted for collision prediction is turning in a direction approaching the own vehicle, this is considered to mean that pattern matching has become difficult because the lateral side of the targeted object of collision prediction was previously included in the image information, but not to mean that the determination on the image detection target made by the pattern matching execution section up until then has been erroneous. Specifically, there is still a high probability that the radar detection target detected by the radar apparatus should still be determined as being identical. Accordingly, under the conditions that the object targeted for collision prediction is turning in a direction approaching the own vehicle, and that the image detection target cannot be detected by the pattern matching execution section, the collision prediction section predicts whether the radar detection target, as an object of collision prediction, is likely to collide with the own vehicle. Accordingly, the reliability of collision prediction can be secured, further resulting in prevention of unnecessary driving support, since the radar detection target has a high probability of being a target that is supposed to be determined as being identical. Additionally, even if the image detection target is not detected and therefore the target is not determined as being identical, delay in activating the driving support by the support execution section can be prevented since collision can be predicted using the radar detection target as an object.

BRIEF DESCRIPTION OF THE DRAWINGS

The object described above and other objects, features, and advantages of the present disclosure are clarified by the detailed description below with reference to the accompanying drawings. In the accompanying drawings:

FIG. 3 is a flowchart of control performed by a detection ECU according to the present embodiment.

DESCRIPTION OF EMBODIMENTS

Figure 1:
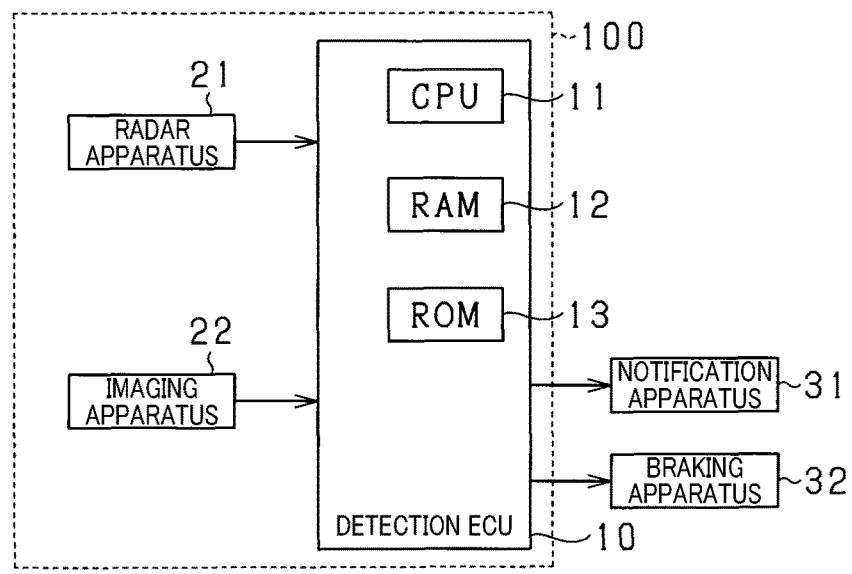
FIG. 1 is a schematic diagram of a driving support apparatus according to the present embodiment.

FIG. 1 illustrates a driving support apparatus 100 mounted to a vehicle (own vehicle) and detecting a target present in the surrounding area of the own vehicle such as ahead of the own vehicle in the traveling direction to perform a driving support control. The driving support control functions as a PCS system for avoiding collisions with the target or for reducing collision damage. The driving support apparatus 100 also functions as a collision prediction apparatus according to the present embodiment.

In FIG. 1, the driving support apparatus 100 is configured by a detection ECU 10, a radar apparatus 21 and an imaging apparatus 22.

The radar apparatus 21 is a known millimeter wave radar, for example, that uses a high frequency signal in the millimeter waveband as transmission waves. The radar apparatus 21 is disposed at the front end part of the own vehicle, and defines a region within a predetermined detection angle as a detectable region. In the detectable region, the position of a target (referred to as radar detection target) is detected. Specifically, probe waves are transmitted to receive reflected waves using a plurality of antennas, with a predetermined cycle. Based on the transmission time of the probe waves and the reception time of the reflected waves, the distance to the radar detection target is calculated. By using the frequency, which has been changed by the Doppler effect, of the reflected waves reflected to the radar detection target, a relative speed is calculated. Additionally, by using the phase difference of the reflected waves received by the plurality of antennas, an azimuth of the radar detection target is calculated. When the position and the azimuth of the radar detection target are calculated, the position of the radar detection target relative to the own vehicle can be detected. The radar apparatus 21 cyclically transmits probe waves, receives reflected waves, and calculates the reflection position and the relative speed, and then transmits the calculated reflection position and the relative speed to the detection ECU 10.

In the present embodiment, the imaging apparatus 22 is a single-lens camera. In that case, the imaging apparatus 22 is mounted at a predetermined vertical level of the own vehicle at the center of the own vehicle in the lateral direction to capture a bird's-eye-view image of a region extending with a predetermined angular range ahead of the own vehicle. The captured image information is transmitted to the detection ECU 10. The imaging apparatus 22 may be a stereo camera, a CCD camera or the like.

The detection ECU 10 is connected to the radar apparatus 21 and the imaging apparatus 22. The detection ECU 10 is a computer including a CPU 11, RAM 12, ROM 13, I/O unit and the like. The detection ECU 10 causes the CPU 11 to execute a program installed in the ROM 13 to realize these functions. The detection ECU 10 corresponds to a radar-detection target position detection section, a pattern matching execution section, an image-detection target position detection section, an identical target determination section, a collision prediction section, a support execution section and a determination processing execution section.

In the present embodiment, a plurality of programs is installed in the ROM 13. The installed programs in particular are a pattern matching program, a determination program, a prediction program and a driving support program.

The pattern matching program detects brightness of the image information sent from the imaging apparatus 22, and based on the detected brightness, performs pattern matching with a predetermined target template. Specifically, the pattern matching is performed at each position on the image by shifting the target template little by little in longitudinal and lateral directions in a predetermined order. The pattern matching at each position refers to a determination process of calculating the degree of matching between the brightness of the image at the position and the brightness of the target template, and determining whether the calculated degree of matching is larger than a reference value. In the determination process, when the degree of matching between the image brightness at the position and brightness of the target template is determined as being larger than the reference value, a portion having brightness information that matches the target template is determined as being present in the image, and thus the portion is detected as an image detection target.

The target templates, which are typical shape patterns of the front or rear of targets as objects, are stored in the ROM 13. The lateral sides of the targets are not stored as a target template. This is because targets having a lateral side with a large area, such as trucks, tend to have a wide variety of shape patterns of lateral sides. Therefore, when such lateral side shape patterns of the targets that are predicted to collide have to be stored as target templates in addition to all other lateral side shape patterns, an excessively large number of shape patterns may have to be stored as target templates.

Based on the information of the radar detection target and the image detection target, the determination program determines whether the targets are identical. Specifically, based on a radar detection target position and an image detection target position, the determination program associates these positions, if located nearby with each other, as being derived from an identical target. The radar detection target position is obtained from a radar detection target, and the image detection target position is obtained from an image detection target detected by pattern matching. If the image detection target position is present near the radar detection target position (in the present embodiment, and if the distance between the radar detection target position and the image detection target position is within a predetermined range), the probability of the target actually being present at the radar detection target position is high. The state in which the position of a target is accurately obtained by the radar apparatus 21 and the imaging apparatus 22 is referred to as a fusion state. The target that has been determined to be in a fusion state is determined to be present at the position (hereinafter, referred to as identical target).

For example, when the determination program determines that an identical target is present, the prediction program calculates an approximate straight line using a fitting technique of a straight line, such as a least squares method, to the relative positions of the identical target that has been detected multiple times in the past. Then, the position where the calculated approximate straight line overlaps the own vehicle is calculated as a predicted collision position. When the relative distance between the predicted collision position, which is calculated by the prediction program, and the target is determined as being shorter than a predetermined distance, the driving support program performs a specified driving support process.

Alternatively, if the target is detected only from either the radar apparatus 21 or the imaging apparatus 22, and the identical target determination cannot be performed by the determination program, the prediction program calculates an approximate straight line using a fitting technique of a straight line, such as least squares method, to the relative positions of the target that has been detected by one of the apparatuses. Then, the position where the calculated approximate straight line overlaps the own vehicle is calculated as a predicted collision position. When the relative distance between the predicted collision position, which is calculated by the prediction program, and the target, is determined as being shorter than a predetermined distance, the driving support program performs a specified driving support process. In this case, the predetermined distance is corrected to be shorter as the detection reliability of the target is lower when compared to the target determined as being identical through the determination program. With this correction, the timing for performing the driving support process is delayed. This method of correcting a predetermined distance that relies on the detection reliability is based on the conventional technique.

In the present embodiment, the driving support process corresponds to a notification process, which notifies the driver of a target ahead of the own vehicle that is likely to collide with the own vehicle, and a braking process, which is applied for braking the own vehicle. Accordingly, the own vehicle is provided with a notification apparatus 31 and a braking apparatus 32 as safety apparatuses that are activated in response to a control command from the detection ECU 10.

The notification apparatus 31 is a speaker or a display which is provided in the interior of the own vehicle. Let us assume that a time to collision (TTC: Time-to-collision), which is the time until the own vehicle collides with the target, is shorter than a first predetermined time, and thus the detection ECU 10 determines that the probability of the own vehicle colliding with the target has become high. In this case, in response to the control command from the detection ECU 10, the notification apparatus 31 outputs an audible alarm, alarm message or the like to notify the driver of a risk of collision.

The braking apparatus 32 is an apparatus that brakes the own vehicle. When TTC becomes shorter than a second predetermined time, which is set shorter than the first predetermined time, and thus the detection ECU 10 determines that the probability of the target colliding with the own vehicle has become high, the braking apparatus 32 is activated in response to the control command from the detection ECU 10. In detail, braking force is increased in response to the braking operation performed by the driver (braking assistance function), or automatic braking is applied when braking operation is not performed by the driver (automatic braking function).

The detection ECU 10 according to the present embodiment detects an image detection target by performing pattern matching with a predetermined target template based on the image information sent from the imaging apparatus 22. In this case, the shape patterns stored as the target templates are the front or rear of targets, and thus if the front or rear of the target can be captured in the image, the target can be accurately detected. However, when a lateral side of the target is captured in the image, the target recognition by pattern matching is likely to become difficult since there are no target templates of the lateral sides of targets.

Figure 2:
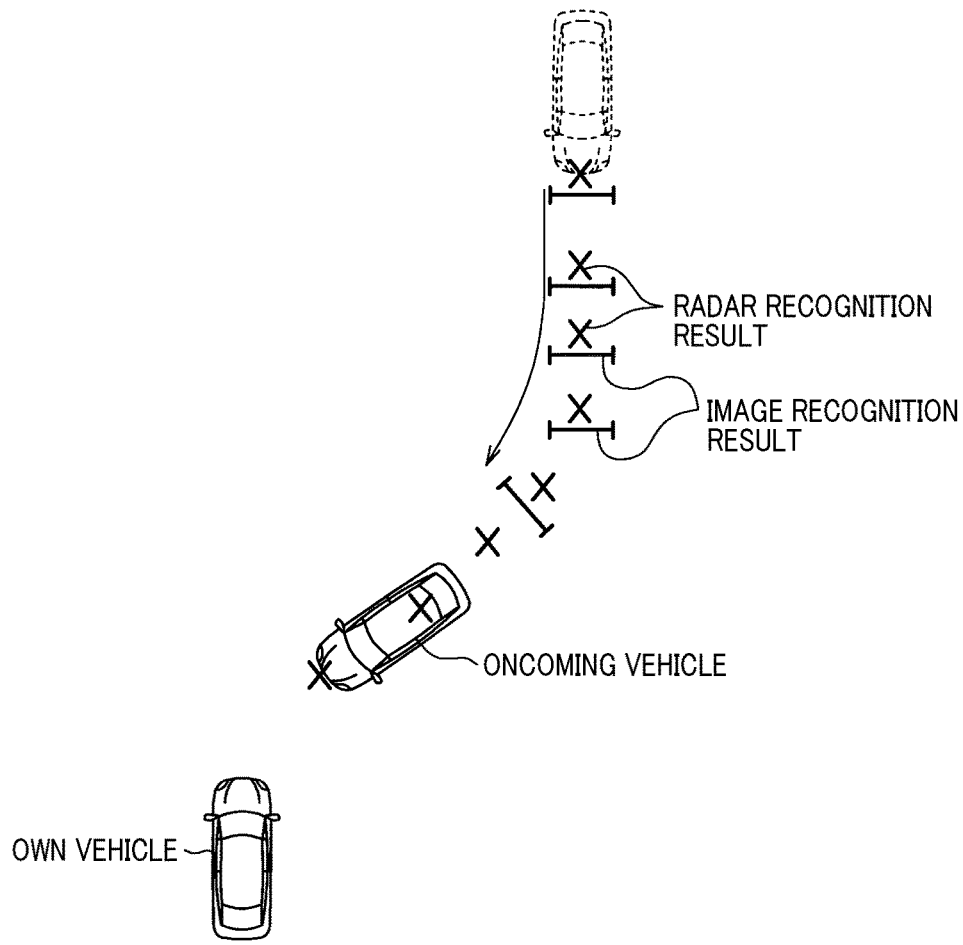
FIG. 2 is a diagram showing a situation where detecting an image detection target by pattern matching is difficult.

As shown in FIG. 2, a target in the forward direction of the own vehicle travels in an oncoming direction in terms of the traveling direction of the own vehicle, and changes its traveling direction to a direction approaching the own vehicle. This change in direction may become especially a problem if a lateral side of the target is included in the image captured by the imaging device 22. In such a situation, detection of the image detection target by pattern matching becomes difficult, and therefore, the driving support program will be executed based on the position information of the radar detection target. In this case, since the detection reliability decreases compared to the case when the target has been determined as being identical between the image and radar detections, the predetermined distance is corrected to be shorter so as to perform the control of delaying the activation of the specified driving support. However, under the aforementioned condition, since the target and the own vehicle are likely to collide with each other, delaying the activation of the driving support is not preferred. When the driving support is activated with the reliability in target detection being decreased, unnecessary activation of driving support increases.

In the situation shown in FIG. 2, the reason why detection of the image detection target has become difficult is considered to be because a lateral side of the target was previously included in the image captured by the imaging apparatus 22. Therefore, there is a low probability that detection of image detection targets by pattern matching up until then has been erroneous. Specifically, there is still a high probability that the radar detection target detected by the radar apparatus 21 is a target that should still be determined as being identical. Therefore, the detection ECU 10 according to the present embodiment performs collision prediction for the radar detection target that is likely to collide with the own vehicle. This collision prediction is performed on the condition that the identical target is turning in a direction approaching the own vehicle, and that the image detection target can no longer be detected by pattern matching. Consequently, the accuracy of collision prediction can be secured.

In this case, if the predicted collision position is calculated from an approximate straight line which is approximated through straight line fitting the relative positions of the target that is turning in a direction approaching the own vehicle, the positional error in the collision prediction is likely to increase. Accordingly, the predicted collision position is calculated by obtaining an approximate curve by approximating the positions, through curve fitting, of the target that is turning in a direction approaching the own vehicle calculated multiple times in the past, relative to the own vehicle. Due to this, the increase in calculation error in the predicted collision position can be prevented.

In the present embodiment, the present control is performed towards only oncoming vehicles (including motorcycles (motorbikes) or bicycles) traveling in the opposing lanes ahead of the own vehicle in the traveling direction. When the target is for example a person, since there are fewer different lateral side patterns of a person compared to a vehicle, lateral sides of a person can be stored as target templates. Accordingly, even if the lateral side of a target (person) is included in the image captured by the imaging apparatus 22, the target can be detected by pattern matching by pre-storing lateral sides of a person as target templates. Furthermore, the difference between the front and lateral side of a person is not as large as the difference between the front and lateral side of a vehicle. That is, even when the target is turning in a direction approaching the own vehicle, the target detection can be performed by pattern matching. Conversely, when the target cannot be detected by pattern matching because the target is turning in a direction approaching the own vehicle, there is a high probability that the target detection produced by pattern matching up until then has been erroneous. Accordingly, performing the control targeting a person is inappropriate. In consideration of the above, collision between a radar detection target and the own vehicle is predicted by targeting only an oncoming vehicle traveling in the opposing lane ahead of the own vehicle in the traveling direction.

In the present embodiment, a collision prediction process in FIG. 3 described later is performed by the detection ECU 10. The collision prediction process shown in FIG. 3 is cyclically performed by the detection ECU 10 while the power is turned on by the detection ECU 10.

Firstly at step S100, a target present ahead of the own vehicle detected by the radar apparatus 21 is detected as a radar detection target. At step S110, an area ahead of the own vehicle is captured by the imaging apparatus 22, and pattern matching is performed for the feature points extracted from the captured image so as to detect an image detection target.

At step S120, it is determined whether the radar detection target detected at step S100 and the image detection target detected in S110 are identical with each other. If it is determined that the radar detection target and the image detection target are identical with each other (YES at S120), the process proceeds to step S130.

At step S130, it is determined whether the target determined as being identical is an oncoming vehicle traveling in the opposing lane. Specifically, a ground speed of the target is calculated from the relative speed of the radar detection target calculated by the radar apparatus 21 and the speed of the own vehicle. Then, if the calculated ground speed has a negative value, the target is determined as traveling in an oncoming direction in terms of the traveling direction of the own vehicle. The ground speed of the own vehicle in the traveling direction herein is taken to have a positive value. If it is determined that the target determined as being identical is traveling in an oncoming direction in terms of the traveling direction of the own vehicle, it is then determined whether the target has matched the vehicle stored as a target template. If it is determined that the target has matched the vehicle stored as a target template, it is then determined that the target determined as being identical is an oncoming vehicle traveling in the opposing lane. If it is determined that the radar detection target is an oncoming vehicle traveling in the opposing lane (YES at S130), the process proceeds to step S140.

At step S140, it is determined whether the radar detection target and the image detection target can be fixed as being identical with each other. In the present embodiment, if the number of times of the identical target determinations made at step S120 is larger than the predetermined number of times, it is determined whether the ratio of the number of occasions of the radar detection target and the image detection target determined as being identical has exceeded the predetermined ratio, with respect to the number of times the identical target determination has been made. When the ratio of the number of occasions of the radar detection target and the image detection target determined as being identical with each other is larger than the predetermined ratio, the radar detection target and the image detection target are fixed as being identical. If it is determined that the radar detection target and the image detection target can be fixed as being identical with each other (YES at S140), the process proceeds to step S150.

At step S150, it is determined whether the line approximating the relative positions of the identical target detected multiple times in the past describes an arc towards the own vehicle, and whether the approximate line passes through the nearby area of the own vehicle including the own vehicle. If it is determined that the line approximating the relative positions of the identical target detected multiple times in the past describes an arc towards the own vehicle, and the approximate line passes through the nearby area of the own vehicle including the own vehicle (YES at S150), the process proceeds to step S160. At step S160, if the image detection target cannot be detected by pattern matching for the targets fixed as being identical and also for the oncoming vehicle approaching the own vehicle, a permission flag which permits prediction of collision targeting only the radar detection target is turned on (permission flag=1), and the process proceeds to step S180 described later. Once the permission flag is turned on, the status of the permission flag being turned on is maintained for a predetermined period of time.

If it is determined that the radar detection target and the image detection target are not identical with each other (NO at S120), or if it is determined that the radar detection target is not an oncoming vehicle traveling in the opposing lane (NO at S130), or if it is determined that the radar detection target and the image detection target should not be fixed as being identical with each other (NO at S140), or if it is determined that the line approximating the relative positions of the identical target detected multiple times in the past does not describe an arc towards the own vehicle, or if it is determined that the approximate line does not pass through the nearby area of the own vehicle including the own vehicle (NO at S150), then the process proceeds to step S170. At step S170, the permission flag is turned off (permission flag=0), and the process proceeds to step S180.

At step S180, it is determined whether the image detection target can no longer be detected by pattern matching. If it is determined that the image detection target can no longer be detected, the process proceeds to step S190. That is to say, if it is determined that the target detection from the image information has been completed (YES at S180), the process proceeds to step S190.

At step S190, it is determined whether the permission flag is turned on. If it is determined that the permission flag is turned on (YES at S190), the process proceeds to step S200 and a special activation determination is made for the driving support process targeting only a radar detection target. The process includes the execution of the process of predicting collision with the own vehicle and the driving support process.

The special activation determination for the driving support process will be described. The relative positions of the radar detection target calculated multiple times in the past are approximated through curve fitting, and based on the approximated approximate curve, a predicted collision position is calculated. Then, it is determined as to whether the relative distance between the calculated predicted collision position and the target is shorter than the predetermined distance. These processes correspond to the collision prediction process. If it is determined that the relative distance between the calculated predicted collision position and the target is shorter than the predetermined distance, the specified driving support process is performed. The predetermined distance is set to the same as the predetermined distance set if the activation determination is made for the driving support process, targeting the target determined as being identical. Then, the process proceeds to step S210, where the permission flag is reset (the permission flag is turned off), and the present control is terminated.

If it is determined that the image detection target can still be detected, that is if it is determined that the target detection from the image information has not been completed (NO at S180), or if it is determined that the permission flag is turned off (NO at S190), the process proceeds to step S220, and an ordinary activation determination is made for the driving support process. The process includes the execution of the process of predicting collision with the own vehicle and the driving support process.

The ordinary activation determination for the driving support process will be described. For example, let us assume a case where the image detection target is still being detected, that is, the target detection from the image information has not been completed (NO at S180), and the target determined as being identical is present. In this regard, the relative positions of the identical target calculated multiple times in the past are approximated by straight line fitting, and based on this approximate straight line, a predicted collision position is calculated. Then, it is determined as to whether the relative distance between the calculated predicted collision position and the target is shorter than the predetermined distance. These processes correspond to the collision prediction process. When the relative distance between the calculated predicted collision position and the target is determined as being shorter than the aforementioned predetermined distance, the specified driving support process is performed.

Alternatively, if it is determined that the permission flag is turned off (NO at S190), and a target has been detected only from either of the radar apparatus 21 and the imaging device 22, and thus the identical target determination cannot be performed, the activation determination is made for the driving support process, targeting the target detected from one of the apparatuses. In this case, the predicted collision position is calculated from the target information detected from one of the apparatuses, and by correcting the predetermined distance based on the detection reliability of the detected target, the ordinary activation determination is made for the driving support process.

As described above, when the relative distance between the calculated predicted collision position and the target is determined as being shorter than the predetermined distance, the specified driving support process is performed. Then, the present control is terminated.

With the aforementioned configuration, the present embodiment provides the advantageous effects described below.

It is predicted whether a radar detection target, which is an object targeted for collision prediction, is likely to collide with the own vehicle, under the conditions that the target is turning in a direction approaching the own vehicle, and that the image detection target cannot be detected by pattern matching. Accordingly, the reliability of collision prediction can be secured, further resulting in prevention of unnecessary driving support, since the radar detection target has a high probability of being a target that is supposed to be determined as being identical. Additionally, delay in activating the driving support process can be prevented, since the collision prediction is performed targeting a radar detection target even when an image detection target is no longer detected and thus no target is determined as being identical.

If the special activation determination is made for the driving support process targeting only the radar detection target, the predetermined distance set for this activation determination is set to the same as the predetermined distance set if the activation determination is made for the driving support process, targeting the target determined as being identical. Accordingly, delay in activating the driving support process can be prevented.

The collision prediction is performed targeting a radar detection target as a target predicted to collide with the own vehicle only when the target is fixed as being identical, under the conditions that the target is turning in a direction approaching the own vehicle, and that an image detection target cannot be detected by pattern matching. Accordingly, even when it is a collision prediction targeting a radar detection target as a target predicted to collide with the own vehicle, the accuracy of collision prediction can be increased, further leading to prevention of unnecessary driving support process.

If the prediction of whether the own vehicle is likely to collide is performed targeting the radar detection target, an oncoming vehicle present ahead of the own vehicle traveling in the opposing lane is only accepted as the target. Accordingly, erroneous prediction can be prevented which occurs due to performing the present collision prediction targeting a person. By taking an oncoming vehicle traveling in the opposing lane ahead of the own vehicle in the traveling direction as a target, the present control can be performed in places, such as intersections, where targets frequently turn in a direction approaching the own vehicle.

The determination is made as to whether the line approximating the relative positions of the identical target detected multiple times in the past describes an arc towards the own vehicle, and whether the approximate line passes through the nearby area of the own vehicle including the own vehicle. Through this determination, when the target passes in front of the own vehicle, for example, the radar detection target is not taken to be a target for collision prediction. Accordingly, unnecessary collision prediction can be prevented, and further, unnecessary activation of driving support can be prevented.

The aforementioned embodiment may be modified and implemented as follows.

In the aforementioned embodiment, if the identical target determination has been made multiple times, and the ratio of determining the target as being identical has exceeded the predetermined ratio, the radar detection target and the image detection target are fixed as being identical with each other. The condition to determine whether a target can be fixed as being identical does not necessarily have to be a condition where the ratio of determining the target as being identical has exceeded the predetermined ratio. For example, if the number of times the target has been successively determined as being identical in the past has exceeded the predetermined number of times, the target may be fixed as being identical.

In the aforementioned embodiment, the identical target determination is made multiple times to determine whether the radar detection target and the image detection target are fixed as being identical with each other. It is not always necessary to perform determination as to whether the radar detection target and the image detection target can be fixed as being identical.

In the aforementioned embodiment, it is determined whether the line approximating the relative positions of the identical target detected multiple times in the past approximates an arc towards the own vehicle, and whether the approximate line passes through the nearby area of the own vehicle including the own vehicle. In place of this determination, multiple positions where the target has traveled in the past, are connected by lines to create a moving trajectory. Based on the direction of the moving trajectory, it is determined whether the target is facing a direction approaching the own vehicle.

In the aforementioned embodiment, the predetermined distance set in the special activation determination made for the driving support process, is the same as the predetermined distance set in the case of making an activation determination for the driving support process, targeting the target determined as being identical. In this regard, the predetermined distance set in the special activation determination made for the driving support process, may be longer than the predetermined distance set in the case of making an activation determination for the driving support process, targeting the target determined as being identical. If a collision with the own vehicle is predicted from only the information of the target detected by the radar apparatus 21, the accuracy of the information i.e. the reliability for the collision prediction is relatively low when compared to the case of predicting a collision with the own vehicle, based on the information obtained from the radar apparatus 21 and the imaging apparatus 22. Considering this, the predetermined distance set in the special activation determination made for the driving support process, may be longer than the predetermined distance set in the case of making an activation determination for the driving support process, targeting the target determined as being identical. Accordingly, considering the probability in the positional error of the radar detection target, the driving support can be performed in the early stage, and thus prediction for collision between the target and the vehicle can be performed on a safer side.

In the aforementioned embodiment, if the relative distance between the calculated predicted collision position and the target is shorter than the predetermined distance, the specified driving support process is performed. In this regard, it is not always necessary to set the condition for performing the specified driving support process to the case where the relative distance between the calculated predicted collision position and the target is shorter than the predetermined distance. For example, TTC may be calculated based on the relative distance between the predicted collision position and the target, and when the TTC is shorter than the predetermined time, the specified driving support process may be performed.

The present disclosure has been described based on embodiments; however, the present disclosure should not be construed as being limited to these embodiments and configurations. The present disclosure should encompass various modifications and alterations within the region of equivalency. In addition, various combinations and modes, as well as other combinations and modes, including those which include one or more additional elements, or those which include fewer elements should be considered to be in the scope and spirit of the present disclosure.

The invention claimed is:

1. A collision prediction apparatus that obtains reflection information from a radar apparatus and obtains image information from an imaging apparatus, the radar apparatus transmitting probe waves ahead of an own vehicle in a traveling direction and receiving reflected waves reflected from a target, the reflection information being based on the reflected waves, the imaging apparatus capturing an image of a region ahead of the own vehicle in a traveling direction, comprising:

a radar-detection target position detection section that detects a position of a radar detection target that is detected from the reflection information obtained from the radar apparatus;

a pattern matching execution section that detects the target by checking feature points extracted from the image information obtained from the imaging apparatus against pre-stored patterns;

an image-detection target position detection section that detects a position of an image detection target that is the target detected by the pattern matching execution section;

an identical target determination section that determines that the radar detection target and the image detection target are identical when a positional relationship between the radar detection target and the image detection target is a predetermined relationship;

a collision prediction section that predicts whether the own vehicle is likely to collide with an identical target, when the radar detection target and the image detection target are determined to be the identical target by the identical target determination section; and a support execution section that performs driving support to prevent collision between the own vehicle and the target when a collision is likely between the target and the own vehicle is predicted by the collision prediction section; wherein the collision prediction section predicts whether the radar detection target, as the target, detected by the radar-detection target position detection section, is likely to collide with the own vehicle, under conditions that the object is turning in a direction approaching the own vehicle, and that the image detection target can no longer be detected by the pattern matching execution section.

2. The collision prediction apparatus according to claim 1, wherein the collision prediction section sets a condition for satisfying the prediction for the collision of the own vehicle with the radar detection target so as to be the same as a condition for satisfying the prediction for the collision of the own vehicle with the identical target.

3. The collision prediction apparatus according to claim 1, wherein the collision prediction section changes a condition for satisfying the prediction for the own vehicle to collide with the radar detection target so as to be more easily satisfied than by a condition for satisfying the prediction for the own vehicle to collide with the identical target.

4. The collision prediction apparatus according to claim 1, comprising a determination processing execution section that causes the identical target determination section to execute a determination process, of determining whether the radar detection target and the image detection target are identical, multiple times, wherein the collision prediction section accepts the radar detection target only when the condition is met for fixing the radar detection target and the image detection target as being the identical target, as a result of the determination processing execution section causing the identical target determination section to execute the determination process multiple times.

5. The collision prediction apparatus according to claim 1, wherein if the prediction of whether the own vehicle is likely to collide is performed for the radar detection target, the collision prediction section only accepts an oncoming vehicle present ahead of the own vehicle and traveling in an opposing lane.

6. The collision prediction apparatus according to claim 1, wherein the collision prediction section does not accept the radar detection target as the target when the target passes in front of the own vehicle.

7. The collision prediction apparatus according to claim 1, wherein the imaging apparatus is a single-lens camera.

\* \* \* \* \*